United States Patent [19]

Sano

[11] Patent Number: 5,195,131
[45] Date of Patent: Mar. 16, 1993

[54] PRIVATE BRANCH EXCHANGE SYSTEM

[75] Inventor: Toshiyuki Sano, Musashi-murayama, Japan

[73] Assignee: Kabushiki Kaisha Toshiba, Kawasaki, Japan

[21] Appl. No.: 650,612

[22] Filed: Feb. 4, 1991

[30] Foreign Application Priority Data

Feb. 6, 1990 [JP] Japan ................................ 2-26654

[51] Int. Cl.⁵ ...................... H04M 3/46; H04M 3/54
[52] U.S. Cl. .................................. 379/211; 379/210; 379/215
[58] Field of Search ............... 379/211, 212, 210, 213, 379/215, 201

[56] References Cited

U.S. PATENT DOCUMENTS 4,723,273 2/1988 Diesel et al. .................... 379/211
5,023,868 6/1991 Davidson et al. ............... 379/211 X

FOREIGN PATENT DOCUMENTS 0278157 11/1989 Japan .................................. 379/212

Primary Examiner—Thomas W. Brown
Attorney, Agent, or Firm—Finnegan, Henderson, Farabow, Garrett and Dunner

[57] ABSTRACT

A private branch exchange system having a call forward busy function wherein, when a busy incoming-call destination terminal receives a further incoming call, the further incoming call is informed to both of the busy incoming-call destination terminal and a forwarding destination terminal previously set for the busy incoming-call destination terminal. Since a response opportunity to the further incoming call is provided even when the initially-intended incoming-call destination terminal is busy, the response opportunity of the busy incoming-call destination terminal and the forwarding destination terminal to the incoming call can be increased and therefore an incoming-call response rate of the entire system based on the call forward busy function can be increased.

20 Claims, 8 Drawing Sheets

| NO. OF BUSY TERMINAL | NO. OF TERMINAL SET AS BUSY-TIME FORWARDING DESTINATION TERMINAL |
|---|---|
| A(TERMINAL 9-1) | B(TERMINAL 9-2) |
| B(TERMINAL 9-2) | C(TERMINAL 9-3) |
| C(TERMINAL 9-3) | D(TERMINAL 9-4) |
| D(TERMINAL 9-4) | |
| ⋮ | ⋮ |
| N(TERMINAL 9-n) | A(TERMINAL 9-1) |

FIG. 3

| NO. OF BUSY TERMINAL | NO. OF TERMINAL SET AS BUSY-TIME FORWARDING DESTINATION TERMINAL |
|---|---|
| A(TERMINAL 9-1) | B(TERMINAL 9-2) C(TERMINAL 9-3) D(TERMINAL 9-4) |
| B(TERMINAL 9-2) | E(TERMINAL 9-5) F(TERMINAL 9-6) |
| ⋮ | |
| N(TERMINAL 9-n) | A(TERMINAL 9-1) |

FIG.5

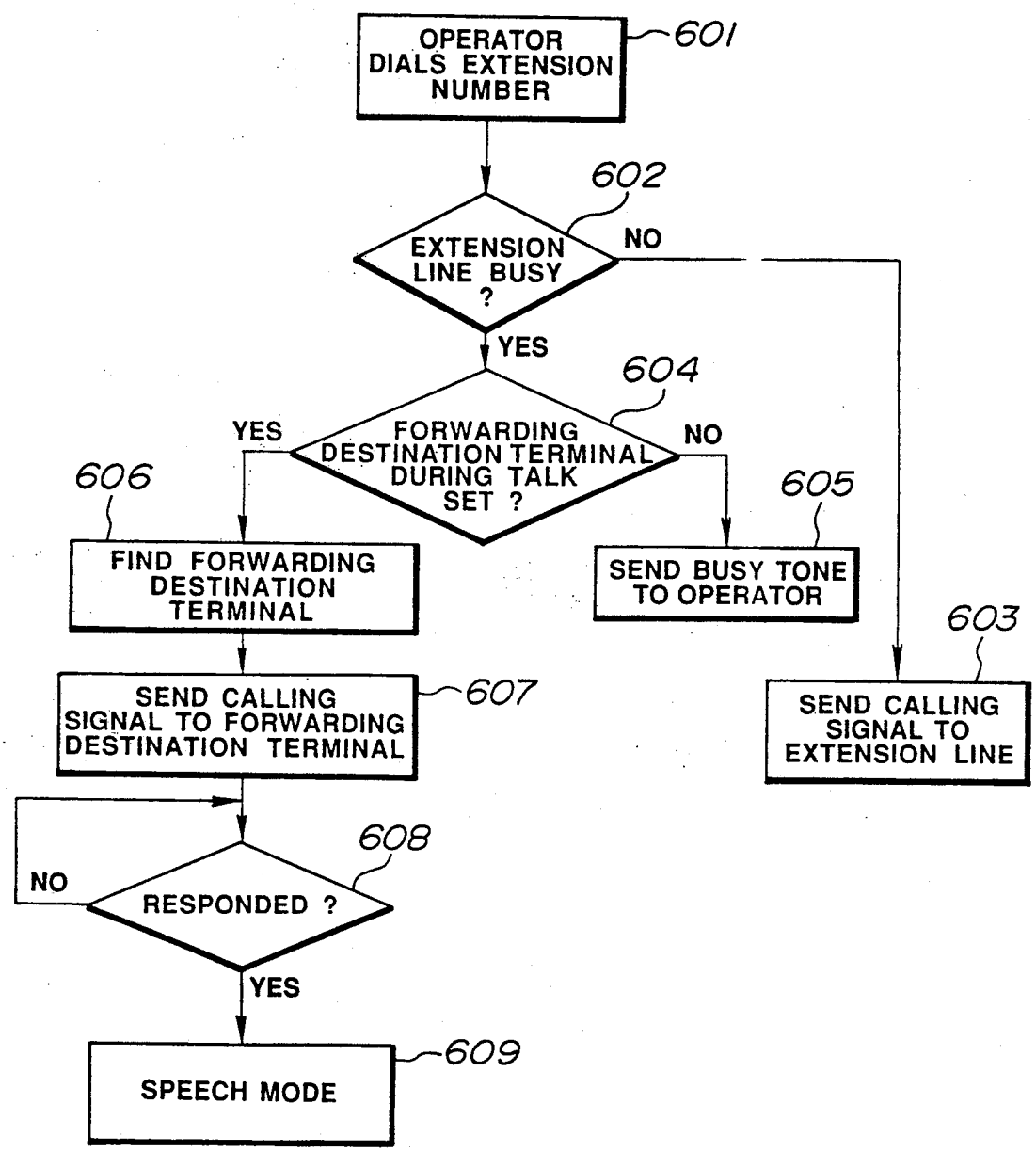
FIG. 6 *(PRIOR ART)*

| NO. OF BUSY TERMINAL | NO. OF TERMINAL SET AS BUSY-TIME FORWARDING DESTINATION TERMINAL |
|---|---|
| A(TERMINAL 9-1) | B(TERMINAL 9-n) |

FIG. 7 *(PRIOR ART)*

PRIVATE BRANCH EXCHANGE SYSTEM

BACKGROUND OF THE INVENTION

1. Field of the Invention

The present invention relates to an improvement in incoming-call transfer control for enhancing an incoming-call response rate concerning a call forward busy function of a private branch exchange system.

2. Description of the Related Art

As is well known, additional service functions of a private branch exchange (PBX) include a call forward busy function. The call forward busy function is, when an incoming call arrives at busy one of terminals belonging to the PBX, to forward the incoming call to a terminal (forwarding destination terminal) which is previously set for the above busy terminal.

The brief operation of the call forward busy function of this sort of prior art PBX will be explained by referring to a flowchart of FIG. 6.

Assume, for example, that, when one of the terminals belonging to the PBX is in a mutual talk with a party through a central office line or an extension line, an operator at the talking terminal receives a request for replacing the current talk by another extension line terminal. In this case, the operator first puts the central office line or extension line being now connected for the current talk temporarily in its hold state and then conducts a dialing operation to call the other extension line terminal to be newly connected thereto as an incoming-call destination terminal (step 601). After completion of the dialing operation, a central control circuit provided within the PBX judges whether or not an extension line connected to the incoming-call destination terminal is in use or busy (step 602). The central control circuit, when deciding that the incoming-call destination terminal is not busy, sends a call signal (bell ringing signal) onto this destination terminal (step 603) and also sends a ring-back tone to the terminal of the operator. The central control circuit, when the incoming-call destination terminal answers to the ringing, connects the incoming-call destination terminal to the central office line or the extension line being temporarily held, whereby the speech communication is established with the incoming-call destination terminal.

On the other hand, when the central control circuit determines in the step 602 that the incoming-call destination terminal is busy, the control circuit judges whether or not a terminal to which the call is to be transferred when the incoming-call destination terminal is busy (forwarding destination terminal) is set for the incoming-call destination terminal (step 604). The central control circuit, when determining such a forwarding destination terminal is not set for the incoming-call destination terminal, sends a busy tone to the operator terminal (step 605). At this time, the operator terminal, when listening to the busy tone, knows that it is impossible to connect the own terminal to the incoming-call destination terminal and must give up the interconnection therebetween or select another terminal as an incoming-call destination terminal. The central control circuit, when determining in step 604 that the forwarding destination terminal is set for the incoming-call destination terminal, retrieves its set data to find a telephone number corresponding to the forwarding destination terminal (step 606). In the illustrated example, the telephone number of the forwarding destination terminal is previously stored in a memory of the PBX, for example, in such a format as shown in FIG. 7. In the case of FIG. 7, when an incoming-call destination terminal A is busy, a forwarding destination terminal B is called. The central control circuit, when determining in the step 604 that the forwarding destination terminal is set for the incoming-call destination terminal, reads out the telephone number of the forwarding destination terminal from the memory (step 606). Thereafter, the central control circuit sends a call signal to the forwarding destination terminal on the basis of the read-out telephone number (step 607). The central control circuit then judges whether or not the forwarding destination terminal has answered to the ringing (step 608). If the forwarding destination terminal answers to the ringing, then the central control circuit connects the forwarding destination terminal to the central office line or extension line being held to establish a speech communication with the forwarding destination terminal.

As a method for previously storing the telephone number of the forwarding destination terminal in the memory, various methods may be considered including a method for storing it through a dialing operation of a special predetermined number and a telephone number for a forwarding destination terminal at the side of a terminal which intends to set the call forward busy function and a method for storing it through depression of a special key exclusively set in place of the above dialing operation of the special number and through a dialing operation of a telephone number of a forwarding destination terminal.

According to the conventional call forward busy function of the PBX, when an incoming-call destination terminal is busy, its incoming signal is forwarded immediately to a forwarding destination terminal. For this reason, the busy incoming-call destination terminal cannot know the presence of the incoming signal and thus cannot answer to it at all. This means that, according to the conventional call forward busy function, the incoming-call destination terminal in its busy mode, when receiving an additional new incoming signal, cannot respond to it and only its forwarding destination terminal can answer to the new incoming signal.

However, even the forwarding destination terminal has his own convenience and cannot always respond immediately to the forwarded incoming signal.

When the operator of the forwarding destination terminal is absent for example, the terminal cannot answer to it permanently. In such a case, the original caller must be kept waiting for a long time while remaining in the call state.

In this way, the call forward busy function of the prior art private branch exchange system has such a problem that, even when an additional incoming signal is directed to an incoming-call destination terminal in a busy state, the presence of the additional incoming signal is not informed to the incoming-call destination terminal and the additional incoming signal is immediately forwarded to a forwarding destination terminal preset for the incoming-call destination terminal, so that not only can the busy incoming-call destination terminal not know the presence of the additional incoming signal nor respond thereto but also the absence of an operator of the forwarding destination terminal results in the original caller being kept waiting while remaining in the call state, because even the forwarding destination terminal to be intended to respond to the incoming signal has its own convenience to handle.

SUMMARY OF THE INVENTION

It is an object of the present invention to provide a private branch exchange system having a call forward busy function, in which, when an incoming-call destination terminal is busy, not only a forwarding destination terminal preset for the incoming-call destination terminal but also the incoming-call destination terminal itself can respond to an additional incoming-call, thus contributing to reduction of a wait time of its original caller.

Another object of the present invention is to provide a private branch exchange system having a call forward busy function, in which, when an incoming-call destination terminal is busy, a plurality of forwarding destination terminals to be intended to receive a forwarded incoming call are respectively prompted to respond to the forwarded incoming call, whereby an overall incoming-call response rate of the system can be further improved.

A further object of the present invention is to provide a private branch exchange system having a call forward busy function, in which, when an incoming-call destination terminal is busy, a response order of a plurality of forwarding destination terminals to be intended to receive a forwarded incoming call is prescribed to some extent while increasing respective incoming-call response rates, thereby realizing diversified applications of the system.

In accordance with an aspect of the present invention, one of the above objects is attained by providing a private branch exchange system having a private branch exchange, which exchange comprises setting means for previously setting a forwarding destination terminal with respect to a busy incoming-call destination terminal talking with a third party when the busy incoming-call destination terminal receives a new incoming call; memory means for storing therein a data corresponding to the forwarding destination terminal set by the setting means; judgement means for judging whether or not the forwarding destination terminal is set for the busy incoming-call destination terminal when the busy incoming-call destination terminal receives the new incoming call; forwarding means, when the forwarding destination terminal is previously set for the busy incoming-call destination terminal, for forwarding the new incoming call for the incoming-call destination terminal to the forwarding destination terminal; alarming means for alarming also the busy incoming-call destination terminal about presence of the new incoming call simultaneously when an incoming-call forwarding call is issued from the forwarding means; response recognition means for recognizing a response of the incoming-call destination terminal or the forwarding destination terminal to the incoming-call forwarding call or the alarm issued from the alarming means; and response control means for connecting the terminal responded to the incoming-call forwarding call or alarm to an extension line or a central office line associated with the incoming call and for immediately stopping operation of the incoming-call forwarding call or alarm to the not-responded terminal.

The private branch exchange system of the present invention is featured in that, when the forwarding destination terminal is set in such a chain manner that another forwarding destination terminal is repetitively set for the already-set forwarding destination terminal, the incoming-call forwarding call is carried out with respect to the respective forwarding destination terminals at the same time.

The private branch exchange system of the present invention is further featured in that, when the forwarding destination terminal is set in such a chain manner that another forwarding destination terminal is repetitively set for the already-set forwarding destination terminal, the incoming-call forwarding call is carried out sequentially with time with respect to the respective forwarding destination terminals.

In the private branch exchange system of the present invention, when the busy incoming-call destination terminal receives an additional incoming call, the initially-intended incoming-call destination terminal in its busy state is alarmed about the presence of the additional incoming call and at the same time, the additional incoming call is forwarded also to a forwarding destination terminal previously set for the busy incoming-call destination terminal, whereby the presence of the incoming call is informed to both of the forwarding destination terminal and the busy incoming-call destination terminal at the same time.

Thereafter, when either one of the forwarding destination terminal and the busy incoming-call destination terminal responds to the incoming call, the responded terminal is connected to the incoming call to start a speech, whereas the calling operation of the other terminal not responded thereto is immediately stopped.

According to such call forward busy control, even the initially-intended incoming-call destination terminal can known the presence of the incoming call and if desired, can answer to it by stopping the current talk.

At this time, since the forwarding destination terminal can conventionally answer to the incoming call and the busy incoming-call destination terminal can also respond to the additional incoming call as mentioned above, the incoming-call response rate of the entire system can be improved and the wait time of the call originator can be minimized.

Further, in accordance with the present invention, a device is provided to avoid a reduction in the incoming-call response rate of the entire system when the busy incoming-call destination terminal cannot answer to the informed incoming call for some reason, and thus improve the incoming-call response rate of the forwarding destination terminal itself.

For example, the present invention is arranged so that, when forwarding destination terminals are stepwise registered on a chain basis with respect to a busy incoming-call destination terminal, all the forwarding destination terminals are collectively called.

In this call forward busy control, it can be avoided that the response time is prolonged due to the convenience of a single forwarding destination terminal, so that a convenient incoming-call destination terminal is positively prompted to answer to it, whereby the wait time of the call originator can be shortened.

In accordance with the present invention, in addition, in the case where a plurality of forwarding destination terminals are registered on the above chain basis with respect to a single incoming-call destination terminal, when the incoming-call destination terminal is busy, the incoming-call response rate of the forwarding destination terminal itself can be improved by calling the plurality of forwarding destination terminals sequentially with time.

In this call forward busy control, the incoming-call response rate of the forwarding destination terminal itself can be maintained while a response order can be set for the forwarding destination terminals to some extent, whereby the operation of the system can be highly effectively diversified.

BRIEF DESCRIPTION OF THE DRAWINGS

FIGS. 3 and 5 show contents of forwarding destination terminal registration tables of the call forward busy function of the present invention respectively;

FIG. 6 is a flowchart for explaining an example of control operation of a call forward busy function of a prior art private branch exchange system; and FIG. 7 shows contents of a forwarding destination terminal registration table of the conventional call forward busy function.

DESCRIPTION OF THE PREFERRED EMBODIMENTS

Embodiments of the present invention will be detailed with reference to the attached drawings.

Figure 1A:
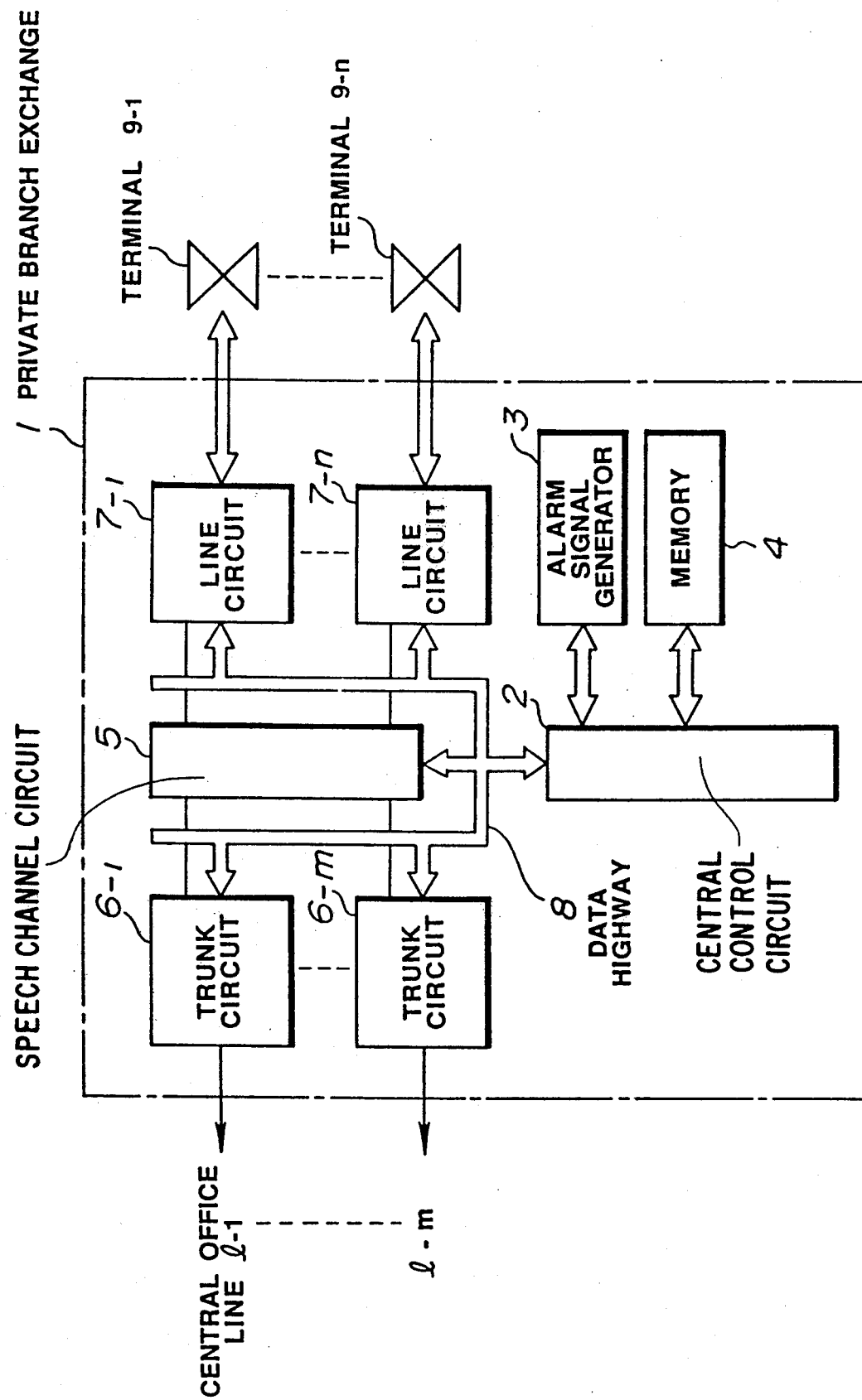
FIG. 1(a) is a block diagram showing a private branch exchange system in accordance with an embodiment of the present invention.
Figure 1B:
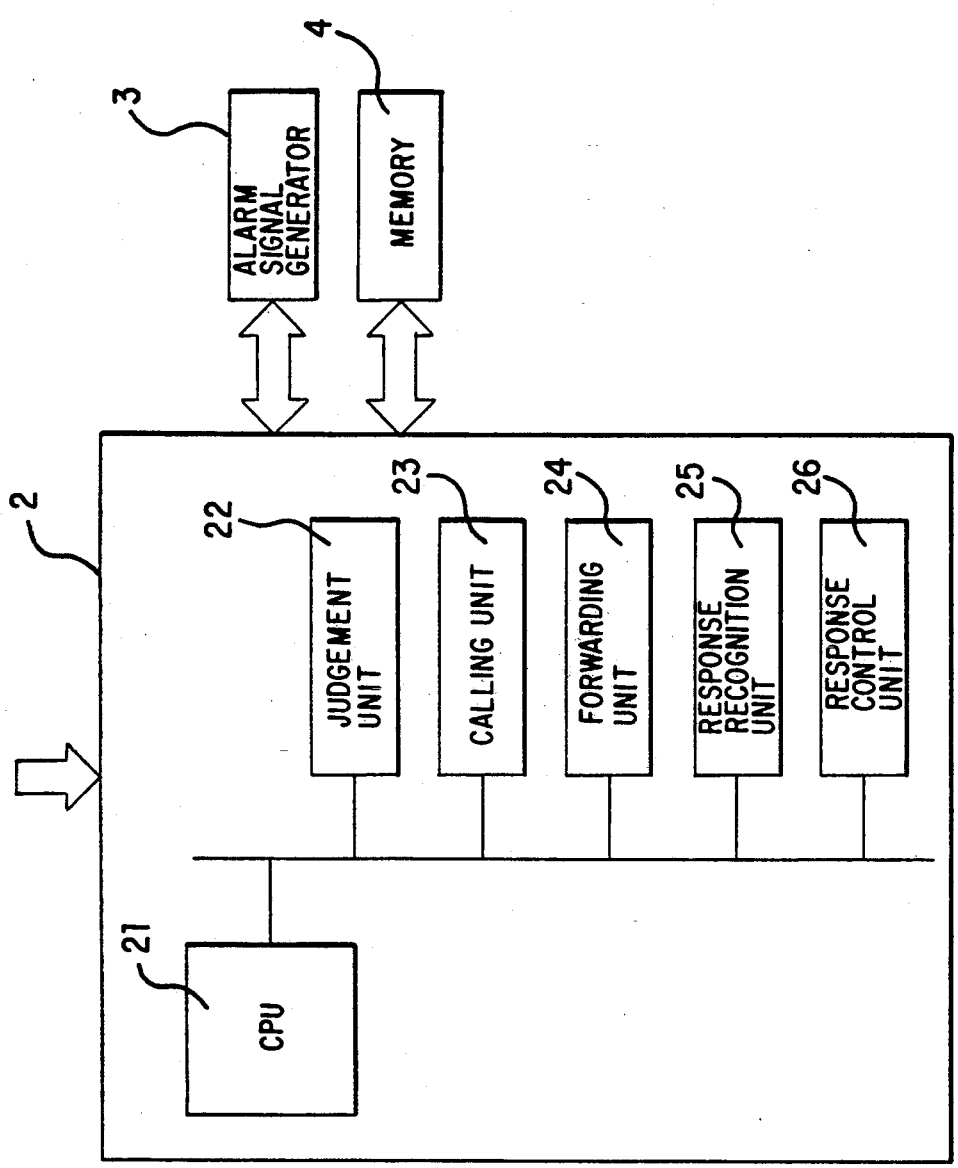
FIG. 1(b) is a block diagram showing a detailed configuration of a central control circuit 2 of FIG. 1(a)

Referring first to FIGS. 1(a) and 1(b), there are shown block diagrams of a private branch exchange system in accordance with an embodiment of the present invention. In the drawing a private branch exchange 1 includes a central control circuit 2, an alarm signal generating circuit 3, a memory 4, a speech-channel circuit 5, trunk circuits 6 (6-1 to 6-m), and line circuits 7 (7-1 to 7-n). In the private branch exchange 1, the central control circuit 2 which comprises a CPU 21, a judgement unit 22, a calling unit 23, a forwarding unit 24, a response recognition unit 25 and a response control unit 26, the speech-channel circuit 5, the trunk circuits 6 (6-1 to 6-m) and the line circuits 7 (7-1 to 7-n) are connected to each other by means of a data highway 8. More specifically, the trunk circuits 6-1 to 6-m are connected to central office lines 1-1 to 1-m, while the line circuits 7-1 to 7-n are connected to terminals 9-1 to 9-n, respectively.

Figure 2:
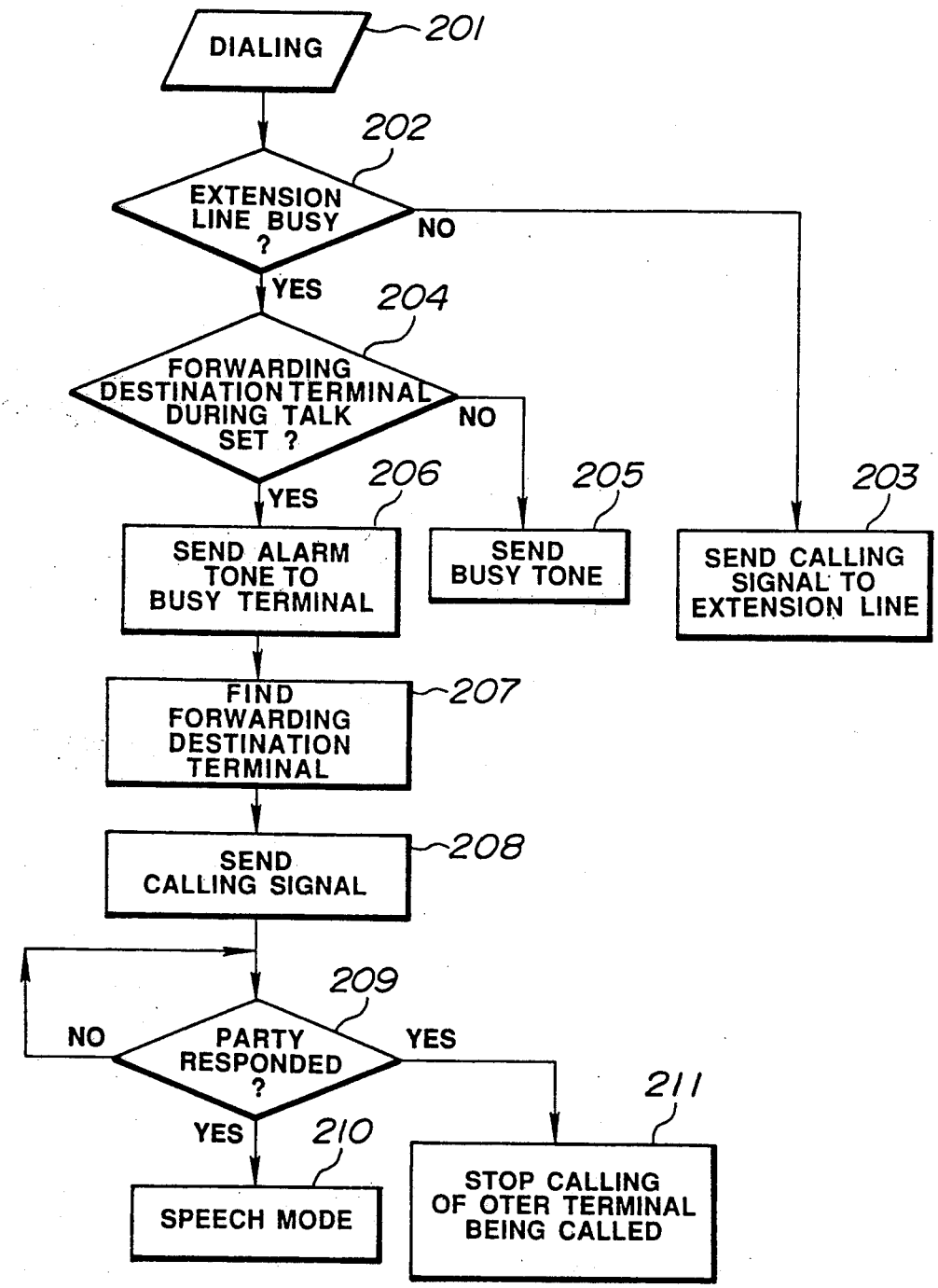
FIG. 2 is a flowchart for explaining an example of control operation of a call forward busy function of the private branch exchange system of the present invention.

Explanation will next be made as to the exemplary control operation of a call forward busy function of the private branch exchange 1 with reference to a flowchart shown in FIG. 2. Assume now that a table having forwarding destination terminals of the call forward busy function registered therein in such a format as shown in FIG. 7 is previously prepared and stored in the memory 4 of the private branch exchange 1. When an operator at one of the extension terminals belonging to the private branch exchange 1 is now talking with a party through one of the central office lines 1-1 to 1-m or through another one of the extension lines and the operator wishes to transfer the communication to another one of the extension line terminals, the operator sets the central office line or the extension line being connected with the party for the current talk temporarily in its hold state and then calls the extension terminal (incoming-call destination terminal) to be next connected, e.g., the terminal 9-1 (step 201).

After completion of the calling of the terminal 9-1, the CPU 21 of the private branch exchange 1 judges by monitoring the status of the line circuit 7-1 whether or not the incoming-call destination terminal 9-1 is talking or busy (step 202). The calling unit 23, when determining that the incoming-call destination terminal 9-1 is not busy, sends a call signal (bell ringing signal) to the incoming-call destination terminal 9-1 (step 203) and also sends a ring-back tone to the caller extension terminal. The response recognition unit 25 detects that the incoming-call destination terminal 9-1 has answered to the call signal, response control unit 26 connects the incoming-call destination terminal 9-1 to the office line or the extension terminal being set in the hold state, thus establishing a mutual speech communication with the incoming-call destination terminal 9-1 and the party.

When determining in the step 202 that the incoming-call destination terminal 9-1 is busy, on the other hand, the judgement unit 22 retrieves corresponding data in the memory 4 to judge whether or not a number (refer to FIG. 7) for an extension terminal (which will be sometimes referred to as busy-time forwarding destination terminal) to which the incoming call is to be forwarded when the incoming-call destination terminal 9-1 is busy is set and stored in the memory 4 (step 204). The CPU 21 when the judgement unit 22 determines that no busy-time forwarding destination terminal is set for the incoming-call destination terminal 9-1, sends a busy tone to the caller terminal (step 205). At this time, the caller operator can know the impossibility of connection with the incoming-call destination terminal 9-1 by listening to the busy tone, and must give up the interconnection with the incoming-call destination terminal 9-1 or take a step of selecting another one of the extension terminals as its incoming-call destination terminal or the like.

When the judgement unit 22 determines in the step 204 that a busy-time forwarding destination terminal is set for the incoming-call destination terminal 9-1, on the other hand, the CPU 21 activates the alarm-signal generating circuit 3 to send an alarm signal to the busy incoming-call destination terminal 9-1 (step 206). At the same time, the central control circuit 2 sends a ringback signal indicative of the sending of the alarm signal to the caller terminal.

In the illustrated embodiment of the present PBX system, it is assumed that the incoming-call destination terminal 9-1 comprises a multi-function telephone set which is provided with an alarm-tone generating means for generating an alarm tone on the basis of the above alarm signal and with a display means for indicating a call waiting state by flashing a light emitting element (such as an LED) or by other means when the call forward busy function is activated. When the incoming-call destination terminal 9-1 as the multi-function telephone set is busy and receives such an alarm signal as mentioned above, the telephone set issues an alarm tone indicative of the reception of another incoming call and also displays its call waiting state thereon. The operator at the incoming-call destination terminal 9-1 can know the presence of another incoming call by the alarm tone and state indication even during conversation. Subsequently, the forwarding unit 24 retrieves the memory 4 (refer to FIG. 7) to find from the memory a number for the busy-time forwarding destination terminal 9-n previously set for the busy incoming-call destination terminal 9-1 (step 207). Next, the forwarding unit 24 sends a call signal to the associated forwarding destination terminal 9-n on the basis of the number read out from the memory 4 (step 208).

In accordance with the present invention, through the above-mentioned incoming-call forwarding control, when the incoming-call destination terminal 9-1 is busy, a call from the caller terminal is sent to both the forwarding destination terminal 9-n and the initially-directed incoming-call destination terminal 9-1 at the same time.

With the system arrangement using such multifunction telephone sets as mentioned above, the forwarding destination terminal 9-n can respond to the above incoming call merely by means of an off-hook operation. Meanwhile, if desirable, even the incoming-call destination terminal 9-1 talking with the party can answer to the call, for example, by once terminating the conversation and then putting the handset in its on-hook state or operating a call waiting function key for flashing display.

The response recognition unit 25, after sending the call signal in the step 208, judges whether or not the incoming-call destination terminal 9-1 or the forwarding destination terminal 9-n to be then called has responded to the call signal through the aforementioned operation (step 209). The response control unit 26 when having confirmed either one of the incoming-call destination terminal 9-1 and the forwarding destination terminal 9-n has responded to the call, connects the responded terminal to the central office line 1-1 to 1-n) or the extension line being in the hold state. This results in that the responded terminal is put in a mutual talk state with the party through the held central office line (1-1 to 1-m) or the extension line (step 210). At this time, the response control unit 26 immediately stops its calling operation to the other terminal which has not responded (step 211).

In this way, in accordance with the present invention, when the incoming-call destination terminal is busy, the incoming call can be sent not only to its forwarding destination terminal but also to the initially-directed incoming-call destination terminal talking with the party, at the same time. As a result, even the busy incoming-call destination terminal may know the presence of the incoming call during the talk and if desired, may break the current talk at a proper timing and answer to the incoming call. According to circumstances, thus, an initially intended speech of the call originator with the desired terminal may be realized without intervention of any forwarding destination terminal.

This means that, when this is viewed from the entire system, since the present invention is designed so that even the busy incoming-call destination terminal can answer to the incoming call according to circumstances, the incoming-call response rate of the present invention on the call forward busy function can be made higher than that of the prior art system wherein only the forwarding destination terminal can respond to the incoming call, whereby it can be substantially avoided that the call originator is kept waiting.

Further, the present invention is arranged so that, when one terminal answers to the incoming call based on the above call forward busy function, this causes the calling operation to the other terminal to be immediately stopped, thus resulting in realization of wasteless and reliable calling control.

Although explanation has been made in connection with the case where the incoming-call destination terminal is a multi-function telephone set in the foregoing embodiment, any sort of terminal may be employed so long as it has a function of giving, in the speech mode, an alarm indicative of the presence of the incoming call from another terminal to the operator of the incoming-call destination terminal. Such an incoming-call alarm is not limited only to such indication of a call waiting state as mentioned above but may be realized also merely by generating a calling tone (ringing tone). In the latter case, this can be realized by executing the step 206 of the flowchart of FIG. 2 to send the ringing tone to the busy incoming-call destination terminal, in which case an ordinary telephone set may be employed.

In the case where the multi-function telephone set is employed, when the present invention is arranged so that, in the step 206, an alarm signal and a ringing signal are simultaneously sent to the busy incoming-call destination terminal to provide an alarm indication of the reception of an incoming call in the speech mode and also to generate a ringing tone, whereby the ringing to tell the presence of the incoming call can be more reliable.

Meanwhile, the table for the registration of forwarding destination terminals relating to the call forward busy function may be considered to have such a format as shown in FIG. 3 in addition to such a format as shown in FIG. 7. That is, FIG. 3 shows details of a table stored in the memory 4 when the forwarding destination terminals are registered in the table on a so-called chain basis. In this table, more specifically, the forwarding destination terminals are sequentially registered in a chain fashion with respect to their specified terminals, in such a manner that a terminal B is registered for a terminal A, a terminal C is for the terminal B, a terminal D is for the terminal C and so on.

Figure 4:
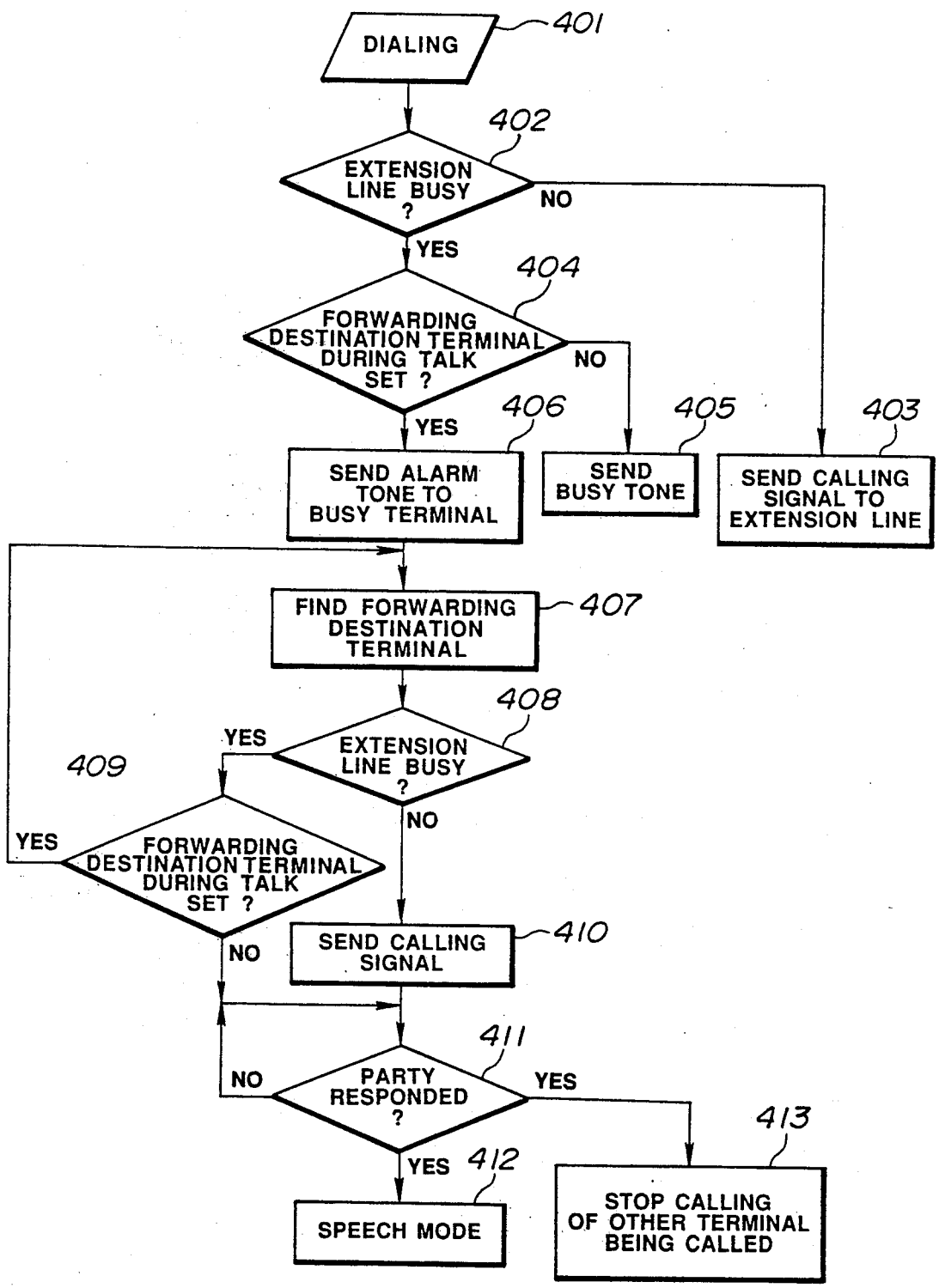
FIG. 4 is a flowchart for explaining another example of the control operation of the call forward busy function of the private branch exchange system of the invention.

Explanation will next be made as to exemplary call forward busy control when the forwarding destination terminals are sequentially registered in such a chain fashion by referring to a flowchart shown in FIG. 4. In the flowchart of FIG. 4, processings other than steps 408 and 409 are exactly the same as the corresponding ones in the flowchart of FIG. 2. First, the caller operator sets the central office line (1-1 to 1-m) or extension line through which the operator is now talking with a party, temporarily in its hold state and then calls an incoming-call destination terminal (for example, terminal 9-1) to be newly connected thereto (step 401). After completion of the calling operation, the CPU 21 judges whether or not the incoming-call destination terminal 9-1 is busy by monitoring the status of the line circuit 7-1 (step 402). The calling unit 23 when determining that the incoming-call destination terminal 9-1 is not busy, sends a calling signal (bell ringing signal) to the terminal 9-1 (step 403) and also sends a ring-back tone to the caller terminal.

When the response recognition unit 25 detects that the incoming-call destination terminal 9-1 answers to the calling, the response control unit 26 connects the terminal 9-1 to central office line (1-1 to 1-m) or the extension line being in the hold state, thus enabling realization of a speech with the party.

Meanwhile, the judgement unit 22 when determining in step 402 that the incoming-call destination terminal 9-1 is busy, retrieves data (refer to FIG. 3) stored in the memory 4 to judge whether or not the number of the forwarding destination terminal for the busy terminal 9-1 is stored in the memory (step 404). At this time, if the central control circuit 2 determines that the forwarding destination terminal is not set for the busy incoming-call destination terminal 9-1, then the CPU 21 sends a busy tone to the caller terminal (step 405). When determining that the forwarding destination terminal is set, the CPU 21 activates the alarm-signal generator 3 to send an alarm signal to the busy incoming-call destination terminal 9-1 (step 406). The incoming-call destination terminal 9-1, when receiving the alarm signal from the alarm-signal generator 3, generates an alarm tone on the basis of the received alarm signal and also displays an alarm indication thereon. Thereby, the operator at the terminal 9-1 can know the reception of a new incoming call from another terminal during the speech.

Subsequently, the forwarding unit 24 retrieves the data of the memory 4, and finds the number of the forwarding destination terminal (refer to FIG. 3) previously stored for the busy incoming-call destination terminal 9-1, that is, reads out the number of the forwarding destination terminal 9-2 from the memory 4 (step 407).

Next, the CPU 21 judges whether or not the forwarding destination terminal 9-2 is busy by monitoring the status of the line circuit 7-2 (step 408). The forwarding unit 24, when the CPU 21 determines that the forwarding destination terminal 9-2 is not busy, sends a calling signal to the forwarding destination terminal 9-2 (step 410). Through the above forwarding control, the call from the caller terminal is sent to both the initially-intended incoming-call destination terminal 9-1 and the forwarding destination terminal 9-2 at the same time.

After having sent the calling signal in the step 410, the response recognition unit 25 judges whether or not which one of the incoming-call destination terminal 9-1 and the forwarding destination terminal 9-2 has responded to the call (step 411). The response control unit 26 when a response from either one of the terminals 9-1 and 9-2 is confirmed, connects the responded terminal to the central office line (1-1 to 1-m) or the extension line being put in the hold state. As a result, the responded terminal can be put in a speech state with the party through the central office line (1-1 to 1-m) or the extension line (step 412). At the same time, the response control unit 26 immediately stops the calling operation to the other terminal which has not responded to it (step 413).

When the CPU 21 determines that the forwarding destination terminal 9-2 is also busy in the step 408, the judgement unit 24 judges whether or not a further forwarding destination terminal is set for the forwarding destination terminal 9-2 in the memory 4 (refer to FIG. 3) through the same processing as in the step 404 (step 409). The central control circuit 2, when determining that the further forwarding destination terminal is not set, proceeds to step 411 and controls to direct the incoming call only to the initially-intended incoming-call destination terminal 9-1.

Meanwhile, when determinating in step 409 that the further forwarding destination terminal is previously set, the central control circuit 2 returns back to the step 407 and thereafter successively performs such call forward busy control as mentioned above.

According to the above call forward busy control, idle one of the forwarding destination terminals stepwise registered in a chain fashion can be preferentially called. As a result, the incoming-call response rate of the forwarding destination terminals can be increased and thus this can contribute to a further improvement in the incoming-call response rate based on the call forward busy function.

In this way, other possible examples of the call forward busy control when the forwarding destination terminals are registered on a chain basis are as follows.

According to one example of the call forward busy control, in the case where the chain structure of the forwarding destination terminals is, for example, such registration of terminal A-terminal B-terminal C-terminal D as shown in FIG. 3, when the terminal A as an incoming-call destination terminal is busy, all the above forwarding destination terminals are called at a time simultaneously with the incoming-call destination terminal A. In this registration method, the incoming-call response rate of the forwarding destination terminals can be further enhanced and thus the incoming-call response rate of the entire system can be further improved.

According to another example of the call forward busy control, in the case where forwarding destination terminals are registered in the same manner as in the above example, when the terminal A as the incoming-call destination terminal is busy, the terminal B set as the forwarding destination terminal is called, at which time if the terminal B does not respond to the calling, then the terminal C as a forwarding destination terminal of the terminal B is called. Such processing is repeated.

In the latter case, an incoming-call response order can be set with respect to the forwarding destination terminals to some extent, so that, when this control is applied to a certain type of system, the smooth operation of the system can be realized.

A further example of registering the forwarding destination terminals relating to the call forward busy function is considered to have such a format as shown in FIG. 5. In the drawing, more in detail, a plurality of forwarding destination terminals are registered for a single incoming-call destination terminal in a forwarding destination terminal registration table stored within the memory 4. In the case where such a forwarding destination terminal registration table is employed, when the incoming-call destination terminal A is busy for example, various call forward busy controls can be carried out including calling of all or specified ones of the forwarding destination terminals B, C and D set for the incoming-call destination terminal A at a time.

In any of the foregoing possible examples of the call forward busy control, the incoming-call response probability of the forwarding destination terminals can be increased and also even the incoming-call destination terminal can respond to the incoming call, which results in that the incoming-call response rate of the entire system can be drastically improved.

Although explanation has been made in connection with only the call forward busy control with respect to the incoming call issued from one of the extension line terminals belonging to the private branch exchange in the foregoing embodiment, it goes without saying that this sort of control may be applied also to an incoming call received directly from one of the central office lines 1-1 to 1-m.

What is claimed is:

1. A private branch exchange system having a private branch exchange, the exchange comprising:
   an incoming call destination terminal for receiving a new incoming call;

memory means for storing data identifying at least one forwarding destination terminal to which a new incoming call for a busy incoming-call destination terminal is to be forwarded;

judgement means for judging whether or not at least one forwarding destination terminal is set for the busy incoming-call destination terminal when the busy incoming-call destination terminal receives the new incoming call;

forwarding means for forwarding the new incoming call for the busy incoming-call designation terminal to the forwarding destination terminal when the forwarding destination terminal is previously set for the busy incoming-call destination terminal;

alarming means for generating an alarm at the busy incoming-call destination terminal to indicate the presence of the new incoming call simultaneously with the forwarding of the new incoming call to the forwarding designation terminal by the forwarding means;

response recognition means for recognizing a response of the incoming-call destination terminal or the forwarding destination terminal to the alarm issued from the alarming means or the call forwarded to the forwarding destination terminal; and response control means for connecting the terminal responding to the forwarded call or the alarm to an extension line or a central office line associated with the incoming call and for immediately stopping forwarding of the incoming call to or generating the alarm from the terminal not responding thereto.

2. A private branch exchange system as set forth in claim 1, wherein the incoming-call destination terminal is a multi-function telephone set and the alarm issued when the incoming-call destination terminal is busy is indicated by means of a lamp, alarm tone sounding or both thereof.

3. A private branch exchange system as set forth in claim 1 or 2, wherein, when a plurality of forwarding destination terminals are set for the busy incoming-call destination terminal, the new incoming call is forwarded to the plurality of forwarding destination terminals at the same time.

4. A private branch exchange system as set forth in claim 1 or 2, wherein, when a plurality of forwarding destination terminals are set for the busy incoming-call destination terminal, the forwarding of the new incoming call is carried out sequentially with time with respect to the plurality of forwarding destination terminals.

5. A private branch exchange system as set forth in claim 1 or 2, wherein, when the forwarding destination terminal is set in such a chain manner that another forwarding destination terminal is repetitively set for the already-set forwarding destination terminal, the forwarding of the new incoming call is carried out with respect to the respective forwarding destination terminals at the same time.

6. A private branch exchange system as set forth in claim 1 or 2, wherein, when the forwarding destination terminal is set in such a chain manner that another forwarding destination terminal is repetitively set for the already-set forwarding destination terminal, the forwarding of the new incoming call is carried out sequentially with time with respect to the respective forwarding destination terminals.

7. A private branch exchange system as set forth in claim 1 or 2, wherein control of the judgement means, the forwarding means, the alarming means, the response recognition means and the response control means is activated either for an incoming call received from an extension line or for an incoming call received from a central office line.

8. A private branch exchange system having a private branch exchange, the exchange comprising:

an incoming-call destination terminal for receiving a new incoming call;

memory means for storing data identifying at least one forwarding destination terminal to which a new incoming call for busy incoming-call destination terminal is to be forwarded;

judgement means for judging whether or not at least one forwarding destination terminal is set for the busy incoming-call destination terminal when the busy incoming-call destination terminal receives the new incoming call;

calling means for issuing an incoming-call forwarding call to both of the incoming-call destination terminal and the forwarding destination terminal when the forwarding destination terminal is previously set for the busy incoming-call destination terminal;

response recognition means for recognizing a response of the incoming-call destination terminal or the forwarding destination terminal to the incoming-call forwarding call; and response control means for connecting the terminal responding to the incoming-call forwarding call to an extension line or a central office line and for immediately stopping operation of the incoming-call forwarding call to the terminal not responding thereto.

9. A private branch exchange system as set forth in claim 8, wherein, when a plurality of forwarding destination terminals are set for the busy incoming-call destination terminal, the incoming-call forwarding call is issued to the incoming-call destination terminal and the plurality of forwarding destination terminals at the same time.

10. A private branch exchange system as set forth in claim 8, wherein, when a plurality of forwarding destination terminals are set for the busy incoming-call destination terminal, the incoming-call forwarding call is issued to the busy incoming-call destination terminal while the incoming-call forwarding call is issued sequentially with time with respect to the plurality of forwarding destination terminals.

11. A private branch exchange system as set forth in claim 8, wherein, when the forwarding destination terminal is set in such a chain manner that another forwarding destination terminal is repetitively set for the already-set forwarding destination terminal, the incoming-call forwarding call is issued to the respective forwarding destination terminals at the same time and also to the incoming-call destination terminal, at the same time.

12. A private branch exchange system as set forth in claim 8, wherein, when the forwarding destination terminal is set in such a chain manner that another forwarding destination terminal is repetitively set for the already-set forwarding destination terminal, the incoming-call forwarding call is issued to the busy incoming-call destination terminal while the incoming-call forwarding call is issued sequentially with time to the respective forwarding destination terminals.

13. A private branch exchange system as set forth in claim 8, wherein control of the judgement means, the calling means, the response recognition means and the response control means is activated either for an incoming call received from an extension line or for an incoming call received from a central office line.

14. A private branch exchange system having a private branch exchange, the exchange comprising:
an incoming call destination terminal for receiving an incoming call;
forwarding means for forwarding the incoming call to a forwarding destination terminal previously set for a busy incoming-call destination terminal when the busy incoming-call destination terminal receives an incoming call; and
incoming-call informing means for informing the busy incoming-call destination terminal of the presence of the incoming call simultaneously with the issuing of an incoming-call forwarding call to the forwarding destination terminal from the forwarding means,
wherein, when a busy incoming-call destination terminal belonging to the exchange receives an incoming call, the incoming call is informed to both the busy incoming-call destination terminal and a forwarding destination terminal previously set for the busy incoming-call destination terminal, the terminal responding to the incoming-call information is connected to an extension line or a central office line associated with the incoming-call, and the issuing of the incoming-call information to the terminal not responding thereto is immediately stopped.

15. A private branch exchange system as set forth in claim 14, wherein the incoming-call destination terminal is a multi-function telephone set, and the incoming-call information issued when the incoming-call destination terminal is busy is indicated by means of a lamp, ringing for the incoming-call information, or both thereof.

16. A private branch exchange system as set forth in claim 14 or 15, wherein, when a plurality of forwarding destination terminals are set for the busy incoming-call destination terminal, the incoming-call information is issued to the plurality of forwarding destination terminals at the same time.

17. A private branch exchange system as set forth in claim 14 or 15, wherein, when a plurality of forwarding destination terminals are set for the busy incoming-call destination terminal, the incoming call information is issued sequentially with time with respect to the plurality of forwarding destination terminals.

18. A private branch exchange system as set forth in claim 14 or 15, wherein, when the forwarding destination terminal is set in such a chain manner that another forwarding destination terminal is repetitively set for the already-set forwarding destination terminal, the incoming-call information is issued to the respective forwarding destination terminals at the same time.

19. A private branch exchange system as set forth in claim 14 or 15, wherein, when the forwarding destination terminal is set in such a chain manner that another forwarding destination terminal is repetitively set for the already-set forwarding destination terminal, the incoming-call information is issued sequentially with time with respect to the respective forwarding destination terminals.

20. A private branch exchange system as set forth in claim 14 or 15, wherein, when the busy incoming-call destination terminal receives an incoming call, control of informing both of the busy incoming-call destination terminal and the forwarding destination terminal set therefor is activated either for an incoming call received from an extension line or for an incoming call received from a central office line.

* * * * *